(12) United States Patent
Dhedhi

(10) Patent No.: US 11,157,089 B2
(45) Date of Patent: Oct. 26, 2021

(54) CHARACTER EDITING ON A PHYSICAL DEVICE VIA INTERACTION WITH A VIRTUAL DEVICE USER INTERFACE

(71) Applicant: Intelligent Waves LLC, Reston, VA (US)

(72) Inventor: Mohammad Salman Dhedhi, Round Rock, TX (US)

(73) Assignee: HYPORI LLC, Reston, VA (US)

( * ) Notice: Subject to any disclaimer, the term of this patent is extended or adjusted under 35 U.S.C. 154(b) by 0 days.

(21) Appl. No.: 16/728,409

(22) Filed: Dec. 27, 2019

(65) Prior Publication Data
US 2021/0200328 A1 Jul. 1, 2021

(51) Int. Cl.
*G06F 3/023* (2006.01)
*G06F 3/0484* (2013.01)
*G06F 3/0488* (2013.01)

(52) U.S. Cl.
CPC ........ *G06F 3/0233* (2013.01); *G06F 3/04842* (2013.01); *G06F 3/04883* (2013.01); *G06F 3/04886* (2013.01)

(58) Field of Classification Search
CPC ............... G06F 3/0233; G06F 3/04842; G06F 3/04883; G06F 3/04886
USPC ....................................................... 715/773
See application file for complete search history.

(56) References Cited

U.S. PATENT DOCUMENTS

| | | | |
|---|---|---|---|
| 9,619,673 B1 | 4/2017 | Vetter et al. | |
| 2007/0242131 A1* | 10/2007 | Sanz-Pastor | H04L 51/20 348/14.02 |
| 2009/0055356 A1 | 2/2009 | Hanyu | |
| 2010/0269047 A1* | 10/2010 | Pahlavan | H04L 43/0864 715/740 |
| 2010/0293460 A1 | 11/2010 | Budelli | |
| 2011/0231427 A1* | 9/2011 | Nakano | G06F 40/274 707/769 |

(Continued)

FOREIGN PATENT DOCUMENTS

| JP | 2010152500 A | * | 7/2010 |
|---|---|---|---|
| KR | 10-2014-0079937 A | | 6/2014 |

OTHER PUBLICATIONS

International Search Report and Written Opinion issued in corresponding International Application No. PCT/US2020/012299 dated Sep. 11, 2020 (11 pages).

*Primary Examiner* — Reza Nabi
*Assistant Examiner* — Hwei-Min Lu
(74) *Attorney, Agent, or Firm* — Pillsbury Winthrop Shaw Pittman LLP

(57) ABSTRACT

In certain embodiments, a message including a plurality of characters may be obtained from an application hosted on a physical client device and a first position of a user interaction with a user interface accessed via the application may be obtained, where the user interface displays the message. A second position within the message may be determined based on the first position. A first and second set of characters may be extracted from the message based on the second position, such that (i) a first number of characters prior to the second position within the message is extracted for the first set of characters and (ii) a second number of characters subsequent to the second position within the message is extracted for the second set of characters. The first and second set of characters may be sent to the physical client device.

20 Claims, 8 Drawing Sheets

(56) References Cited

U.S. PATENT DOCUMENTS

| | | | |
|---|---|---|---|
| 2012/0324404 A1* | 12/2012 | Pahlavan | H04L 43/0864 |
| | | | 715/866 |
| 2014/0053068 A1* | 2/2014 | Devi | G06F 40/169 |
| | | | 715/256 |
| 2014/0098031 A1 | 4/2014 | Aizawa | |
| 2014/0129991 A1* | 5/2014 | Wei | G06F 3/04812 |
| | | | 715/856 |
| 2015/0350118 A1* | 12/2015 | Yang | G06F 16/24578 |
| | | | 715/752 |
| 2016/0070441 A1 | 3/2016 | Paek et al. | |
| 2017/0220129 A1* | 8/2017 | Wu | G06N 5/04 |
| 2018/0004546 A1* | 1/2018 | Ferras Pereira | G06F 3/0236 |
| 2020/0089512 A1* | 3/2020 | Wan | H04L 67/42 |

\* cited by examiner

US 11,157,089 B2

CHARACTER EDITING ON A PHYSICAL DEVICE VIA INTERACTION WITH A VIRTUAL DEVICE USER INTERFACE

FIELD OF THE INVENTION

The invention relates to facilitating character editing on a physical device based on interaction with a virtual device user interface accessed via the physical device.

BACKGROUND OF THE INVENTION

Traditionally, companies that want to protect their confidential information may load management software onto personal devices of their employees and contractors. However, contractors and employees of these companies do not want their personal devices loaded with management software that restricts the use of their personal devices. As an alternative solution, some companies provide their employees and contractors with dedicated company owned devices. This can be both costly and complex. In view of unique challenges in incorporating personal devices such as smart phones and tablets into secure computing environments, there is room for innovations and improvements.

SUMMARY OF THE INVENTION

Aspects of the invention relate to methods, apparatuses, and/or systems for facilitating display of a user interface associated with a virtual device via a client device and character editing on the client device based on interaction with the user interface associated with the virtual device.

One aspect of the disclosure relates to a system comprising circuitry configured to: obtain a message including a plurality of characters from an application hosted on a physical client device; obtain a first position of a user interaction with a user interface accessed via the application, the user interface displaying the message; determine a second position within the message based on the first position; extract a first set of characters and a second set of characters from the message based on the second position, such that (i) a first number of characters prior to the second position within the message is extracted for the first set of characters and (ii) a second number of characters subsequent to the second position within the message is extracted for the second set of characters; and send the first set of characters and the second set of characters to the physical client device.

Another aspect of the disclosure relates to a method comprising: obtaining a message including a plurality of characters from an application hosted on a physical client device; obtaining a first position of a user interaction with a user interface accessed via the application, the user interface displaying the message; determining a second position within the message based on the first position; extracting a first set of characters and a second set of characters from the message based on the second position, such that (i) a first number of characters prior to the second position within the message is extracted for the first set of characters and (ii) a second number of characters subsequent to the second position within the message is extracted for the second set of characters; and sending the first set of characters and the second set of characters to the physical client device.

Another aspect of the disclosure relates to non-transitory computer readable media. The non-transitory computer readable media may store instructions that, when executed by one or more processors, effectuate operations comprising: obtaining a message including a plurality of characters from an application hosted on a physical client device; obtaining a first position of a user interaction with a user interface accessed via the application, the user interface displaying the message; determining a second position within the message based on the first position; extracting a first set of characters and a second set of characters from the message based on the second position, such that (i) a first number of characters prior to the second position within the message is extracted for the first set of characters and (ii) a second number of characters subsequent to the second position within the message is extracted for the second set of characters; and sending the first set of characters and the second set of characters to the physical client device.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
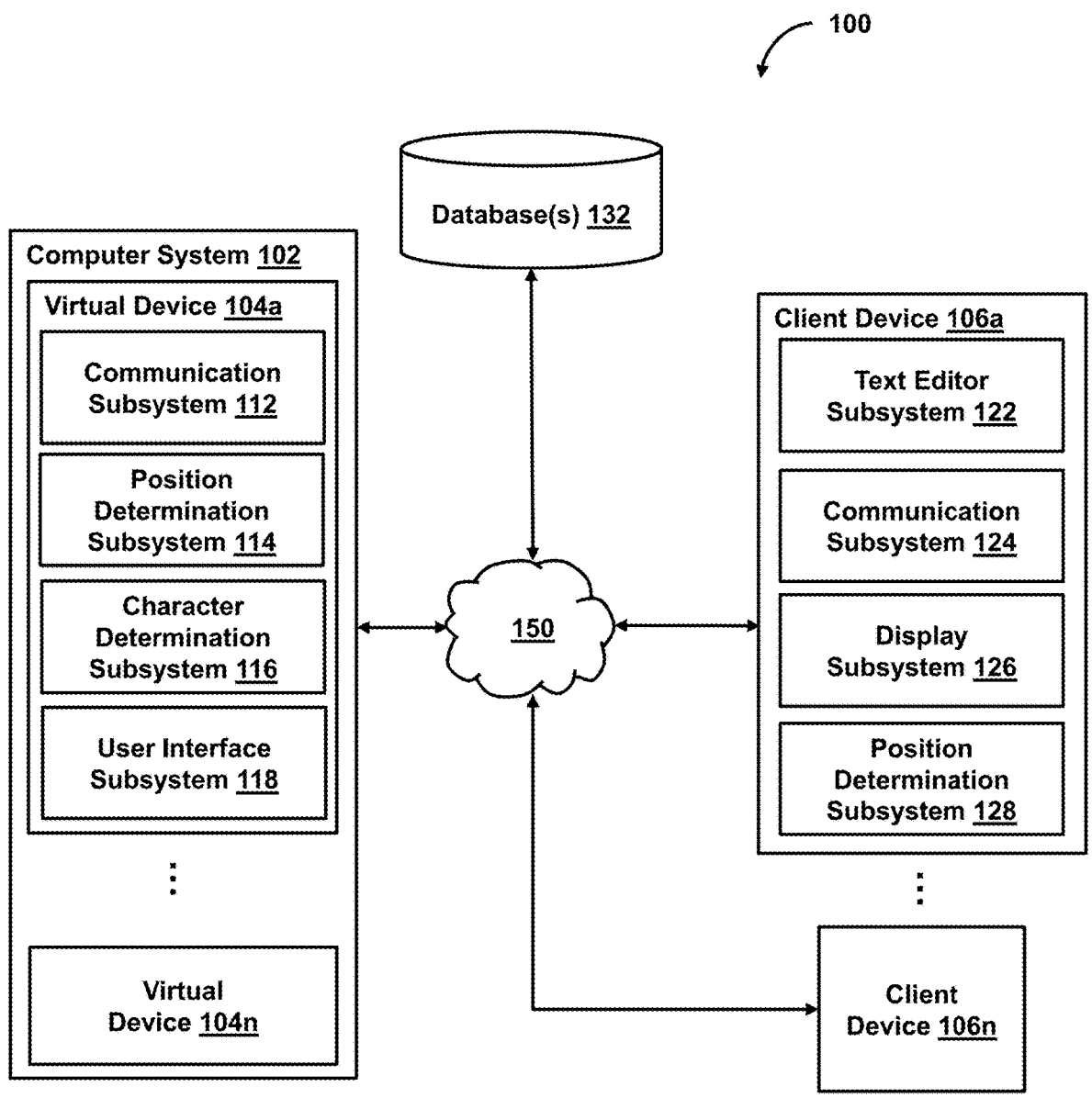
FIG. 1 shows a system for facilitating display of a user interface associated with a virtual device via a client device and character editing on the client device based on interaction with the user interface associated with the virtual device, in accordance with one or more embodiments.

FIG. 1 shows a system 100 for facilitating display of a user interface associated with a virtual device via a client device and character editing on the client device based on interaction with the user interface associated with the virtual device, in accordance with one or more embodiments. As shown in FIG. 1, system 100 may include computer system 102 (for example, a server), client device 106 (or client devices 106a-106n), database 132, or other components. Computer system 102 may include virtual device 104 (or virtual devices 104a-104n) including communication subsystem 112, position determination subsystem 114, character determination subsystem 116, user interface subsystem 118, or other components. Client device 106 may include text editor subsystem 122, communication subsystem 124, display subsystem 126, position determination subsystem 128, or other components. Each client device 106 may include any type of mobile terminal, fixed terminal, or other device. By way of example, client device 106 may include a desktop computer, a notebook computer, a tablet computer, a smartphone, a wearable device, or other physical client device. In some embodiments, a virtual device 104 may be a remote execution environment for the services and applications that make up a device. Each virtual device 104 may thus be a remote execution environment for the services and applications that make up a client device 106 and thus a virtual device 104 may function similarly to a physical client device 106 except that the operating system, data and applications reside and run on a computer system 102 (for example, a server). Virtual devices 104 may thus include virtual applications, such as browsers, emails, games, productivity applications or other applications that execute in virtual devices 104. In one embodiment, computer system 102 may be configured as an Android application environment. In some embodiments, virtual devices 104 hosting Android (or Security Enhancements for Android (SEAndroid)) may be created for each user using Linux's Kernel-based Virtual Machine (KVM) and Quick EMUlator (QEMU). In some embodiments, a client device 106 may be associated with one virtual device 104 or a plurality of virtual devices 104. In some embodiments, a virtual device 104 may be associated with one client device 106 or a plurality of client devices 106.

Users may, for instance, utilize one or more client devices 106 to interact with one another, one or more computer systems 102, or other components of system 100. It should be noted that, while one or more operations are described herein as being performed by components of computer system 102, those operations may, in some embodiments, be performed by components of client device 106 or other components of system 100 and while one or more operations are described herein as being performed by components of client device 106, those operations may, in some embodiments, be performed by components of computer system 102 or other components of system 100.

In some embodiments, system 100 may facilitate display of a user interface (for example, an interactive display of a virtual operating system running on a virtual device or of a virtual application running on the virtual device) associated with a virtual device 104 via a display screen of the client device 106 and may facilitate character editing via such user interface. In the present disclosure, a user interface associated with a virtual device 104 (for example, a user interface associated with a virtual operating system running on (or hosted by) the virtual device 104 or of a virtual application running on (or hosted by) the virtual device 104) may be referred to as a virtual device user interface (UI) and a user interface associated with a client device 106 (for example, a user interface associated with an operating system running on (or hosted by) the client device 106 or of a client application running on (or hosted by) the client device 106) may be referred to as a client device user interface (UI).

In some embodiments, client applications running on (or hosted by) the client device 106 may be accessed via a client device UI. In some embodiments, a client application (or a plurality of client applications) may be associated with a virtual device 104. Such a client application may be accessed via a client device UI and may render (for example, via display subsystem 126) a virtual device UI via a display of the client device 106. In other words, a virtual device UI may be accessed and displayed via a client application running on (or hosted by) the client device 106. In some embodiments, the client applications may correspond to an email application, browser application, or any other application supported by a physical client device 106 (for example, a mobile device).

In some embodiments, in response to a selection of a client application associated with the virtual device 104 (for example, via a client device UI displayed via a display of the client device 106), the display subsystem 126 may display a virtual device UI via a display of the client device 106. In other words, a selection of a client application associated with the virtual device 104 allows virtual device UI to be accessed via a display of the client device 106. The virtual device UI may include a plurality of information/content (for example, icons) relating to applications (for example, virtual applications) that run on (or are hosted by) the virtual device 104. The virtual applications may correspond to an email application, browser application, word application, excel application, or any other application supported by, for example, a physical client device 106. Since the virtual applications are accessible via the client device 106 and are hosted by the virtual device 104, the data associated with the virtual applications may be stored in the virtual device 104 (or computer system 102). For example, database 132 (or another database (not shown) within the computer system 102 or virtual device 104) may store the data associated with the virtual applications. Although database 132 is illustrated as being separate from the computer system 102 and virtual device 104 in FIG. 1, it should be understood that database 132 may be included within the computer system 102 or virtual device 104. The data associated with the virtual applications may include data associated with emails, documents, or other confidential information. Since data (for example, confidential information) may be stored outside of the client device 106, malicious actors may not be able to gain access to such data simply by gaining access to the client device 106.

In some embodiments, one or more virtual applications may be accessed via a client application hosted on the client device 106. For example, a virtual application may be accessed via a virtual device UI displayed via a display screen of the client device 106. The user interface subsystem 118 of the virtual device 104 may generate (or retrieve) a virtual device UI and the communication subsystem 112 of the virtual device 104 may send information associated with the virtual device UI to the client device 106 (for example, communication subsystem 124 of the client device 106 may obtain the information associated with the virtual device UI). The user interface subsystem 118 may send information associated with the virtual device UI in response to a selection of a client application associated with the virtual device 104 and in response to a communication from the client device 106 indicating the selection of the client application associated with the virtual device 104. The information associated with the virtual device UI may include an image of the virtual device UI or a video (for example, a stream of h264 encoded video) associated with the virtual device UI.

The information associated the virtual device UI may be sent to the client device 106 in response to a request from the client device 106. For example, in response to a user selection of a client application running or hosted on the client device 106, the client application may send an application programming interface (API) request to the computer system 102 in order to obtain the information associated with the virtual device UI. The client application may recognize the identity of a user accessing the client application on the client device 106 and the client device 106 (via the client application) may send a request for a virtual device UI associated with the identified user. Alternatively, the client application may request a user to enter his/her user credentials (for example, a username and password combination, biometrics, etc.) and in response to proper identification, the client application may render the virtual device UI specific to the user via a display screen of the client device 106. Different users or client devices 106 may be associated with different virtual device UIs. Accordingly, the client application may connect to one or more virtual devices 104 and may render a plurality of virtual device UIs based on, for example, identification of users associated with the client device 106 or identification of the client device 106.

Figure 2A:
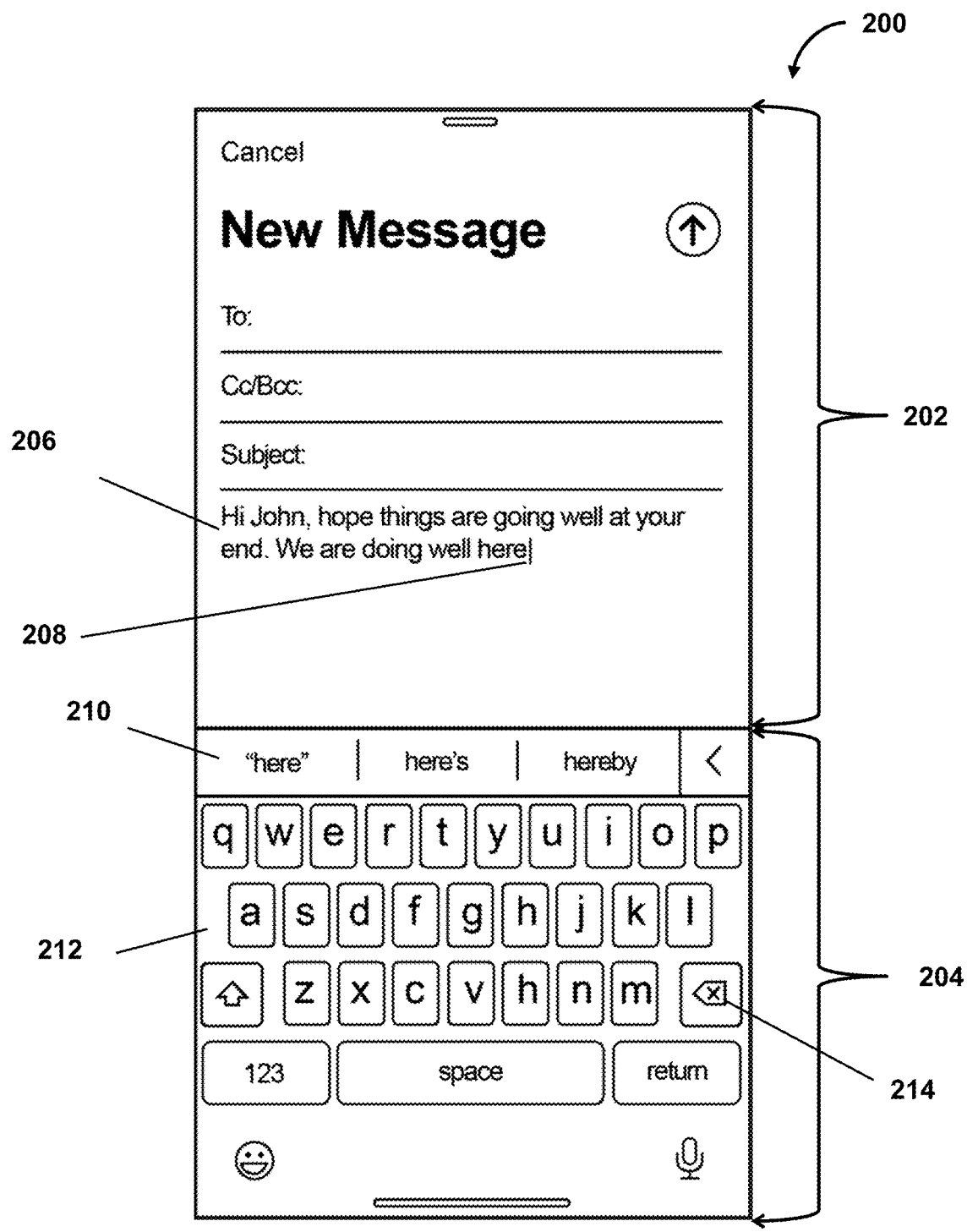
FIGS. 2A-2C show a user interface of a physical client device, in accordance with one or more embodiments.
Figure 2B:
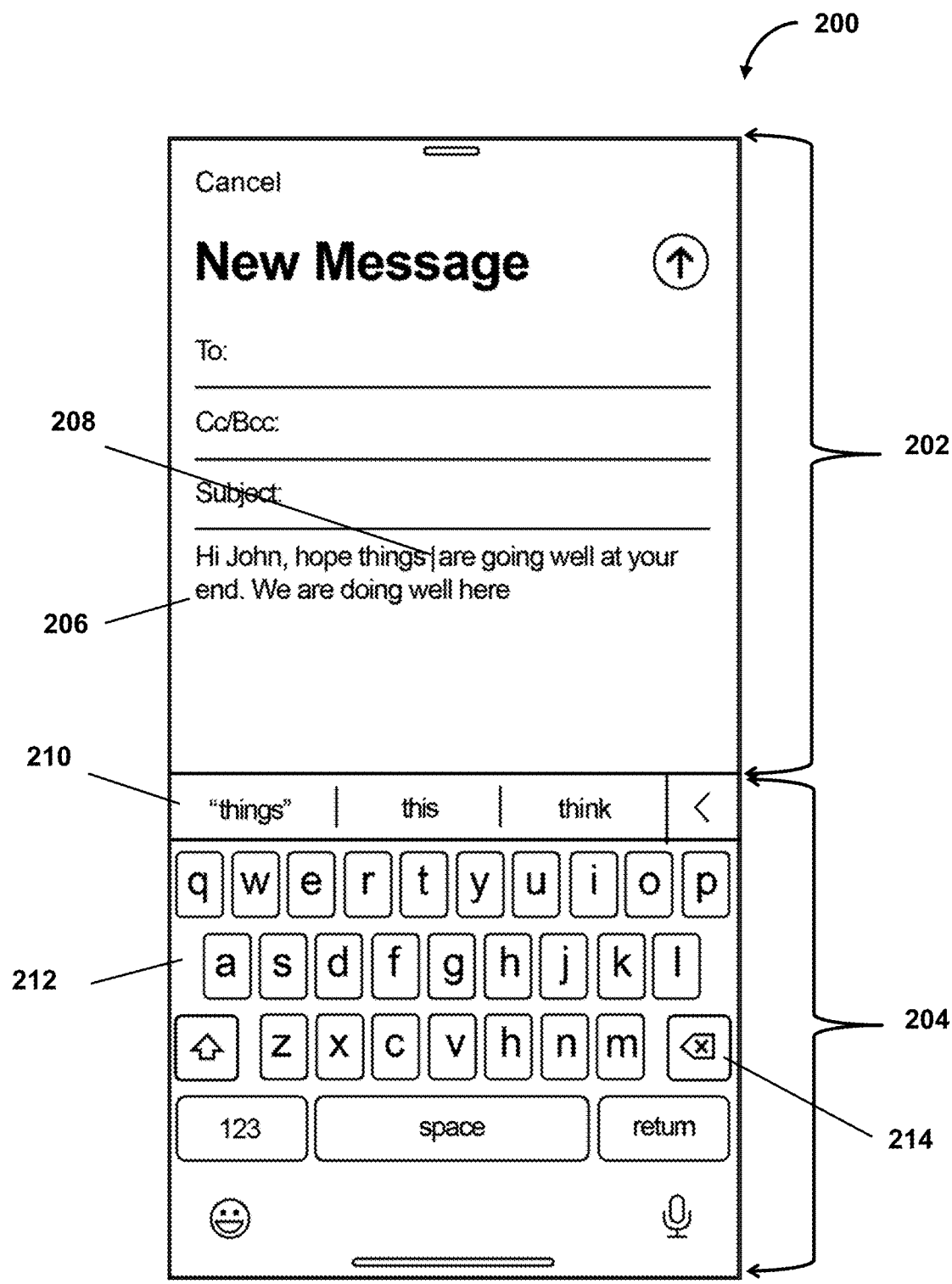
Figure 2C:
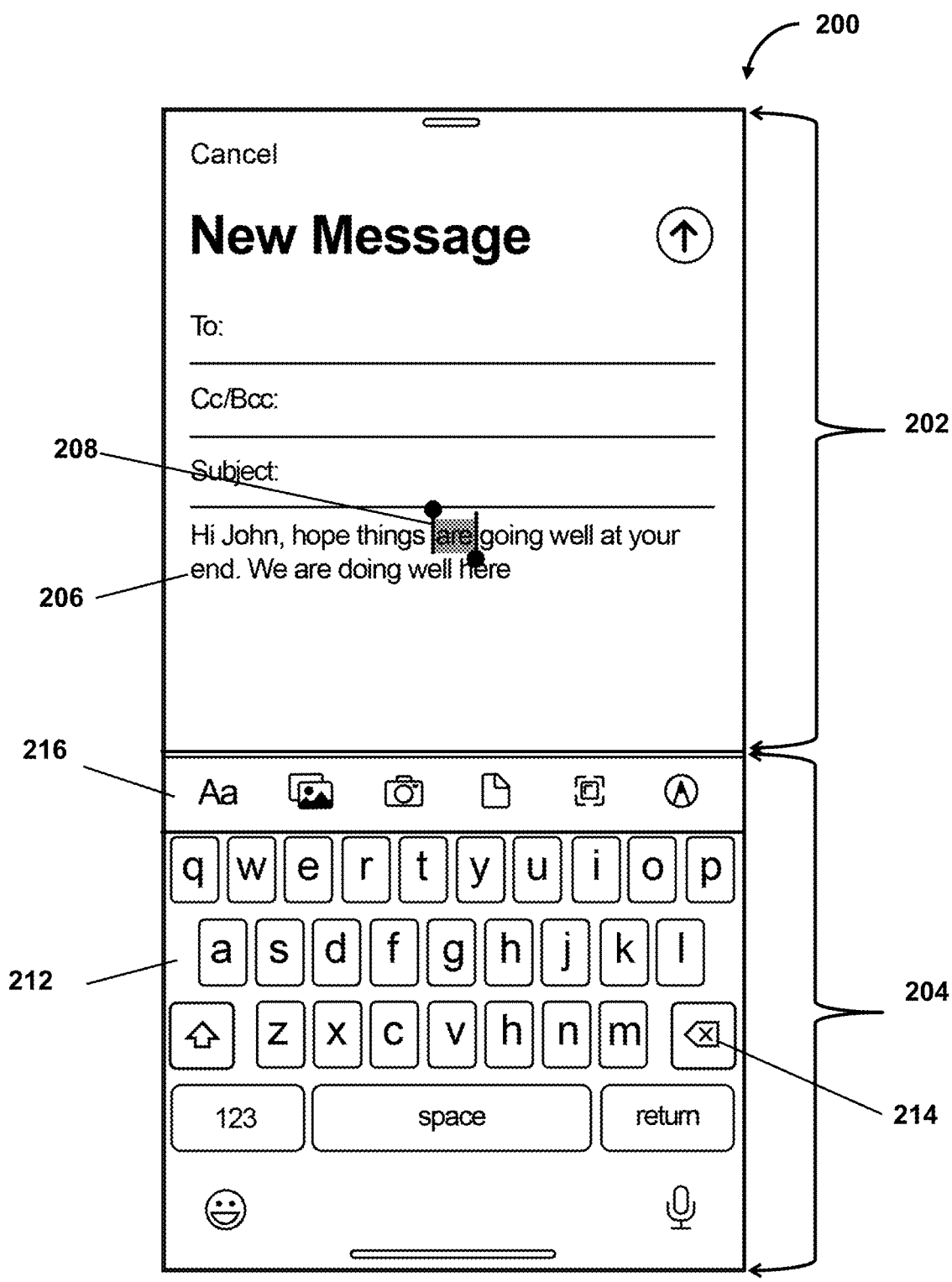

In some embodiments, the display subsystem 126 may display, via a display screen of the client device 106, a user interface 200. FIGS. 2A-2C illustrate a user interface 200 accessed via a client application hosted on the client device 106. The user interface 200 may be displayed via a display of the client device 106. The user interface 200 may include a virtual device UI portion 202 and a client device UI portion 204. The virtual device UI portion 202 may include a message (or message portion) 206 and a cursor (or cursor portion) 208 and the client device UI portion 204 may include a suggestion (or suggestion portion) 210 and a keyboard (or keyboard portion) 212. Additionally, or alternatively, as illustrated in FIG. 2C, client device UI portion 204 may include a formatting portion 216 that includes icons/buttons to format text and add attachments. Although FIG. 2C illustrates a formatting portion 216, it should be understood that a suggestion portion 210 may (additionally or alternatively to formatting portion 216) be included (for example, suggestion portion 210 may additionally or alternatively be included in FIG. 2C and such suggestion portion 210 may include words such as "are," "aren't," and "area") within the client device UI portion 204.

Further, although the information associated with the virtual device UI portion 202 may be obtained from the virtual device 104, the client device UI portion 204 may be obtained locally from the client device 106. For example, the keyboard portion 212 and the suggestion portion 210 may be generated by the client device 106 (for example, by an operating system running on the client device 106). Although it is possible for the keyboard portion 212 and suggestion portion 210 to be generated by the virtual device 104 and displayed via the client application hosted on the client device 106 (in other words, although the keyboard portion 212 may be a virtual keyboard and the suggestion portion 210 may be a virtual suggestion portion), the use of such a virtual keyboard portion or virtual suggestion portion may result in delays in displaying relevant selections of the virtual keyboard or relevant suggestions (for example, displaying via the display of the client device 106 and via the client device UI portion 204) due to network latency issues. For instance, the delays in displaying relevant selections of the virtual keyboard via the client device UI portion 204 may be caused because of network latency issues associated with sending each keystroke from the client application at the client device 106 to the virtual device 104 at the computer system 102, and obtaining, by the client device 106, an updated image of the virtual keyboard (for example, indicating the key selection) from the virtual device 104. Accordingly, it may be advantageous to utilize a keyboard portion 212 and a suggestion portion 210 of the client device 106 (for example, a keyboard portion and suggestion portion associated with (or generated by), for example, the operating system of the client device 106) in order to overcome the network latency issues associated with virtual keyboard portions and virtual suggestion portions.

In some embodiments, the keyboard portion 212 and the suggestion portion 210 (which may be accessed via a client application) may be utilized to enter a message (including a plurality of characters). The client application (which is hosted on the client device 106) may be associated with a client device text editor (hereinafter also referred to as an "invisible text editor"). Any character entered via the keyboard portion 212 or the suggestion portion 210 may be captured by the invisible text editor (for example, the text editor subsystem 122 may capture any character entered via the keyboard portion 212 or the suggestion portion 210) and the client application may send (for example, via communication subsystem 124) such captured character(s) to the virtual device 104 so that the virtual device 104 can update (for example, via the user interface subsystem 118) the appropriate field in the virtual device UI portion 202. For example, every time a character is entered via the keyboard portion 212, the invisible text editor of the client application may capture this character and send the character to the virtual device 104. In response, the virtual device 104 may store one or more characters (for example, of a message) in a virtual device text editor (not shown) and may continue to update this message in the virtual device text editor in response to additional inputs (for example, additional characters or other inputs) received from the client device 106. In addition, the client device 106 (for example, the position determination subsystem 128) may also send a relative cursor position (for example, relative to the character being sent to the virtual device 104 from the client device 106) so that the virtual device 104 is able to keep a track of a current user interaction position (or a current cursor position) within the message. In addition to the message, the virtual device text editor may also include (or store) the current user interaction position. The virtual device text editor and the characters included in the virtual device text editor may be stored in database 132 or any other database within the computer system 102 or the virtual device 104. The invisible text editor and the characters included in the invisible text editor may be stored in database 132 or any other database within the client device 106.

Figure 3A:
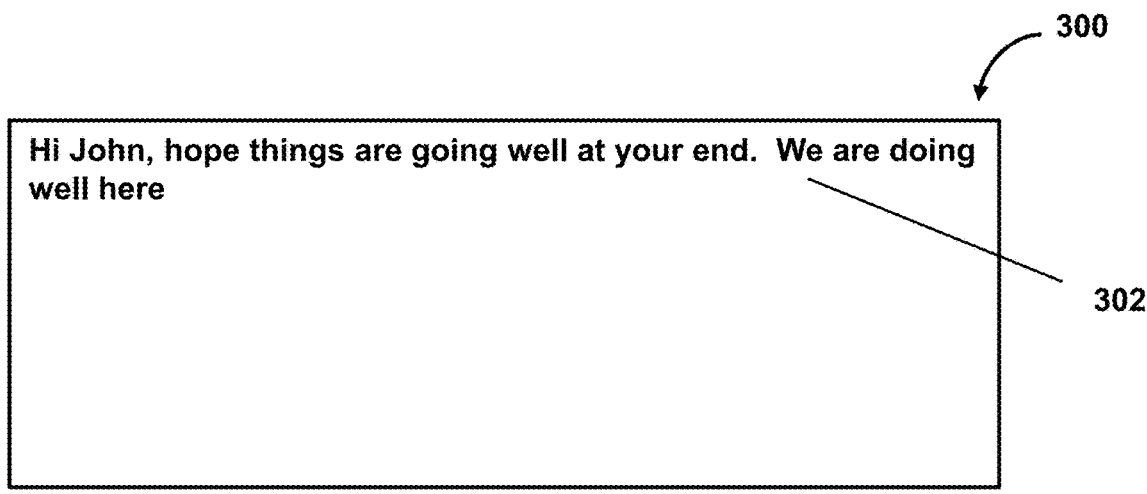
FIGS. 3A-3C show an invisible text editor associated with a client application hosted on a physical client device, in accordance with one or more embodiments.
Figure 3B:
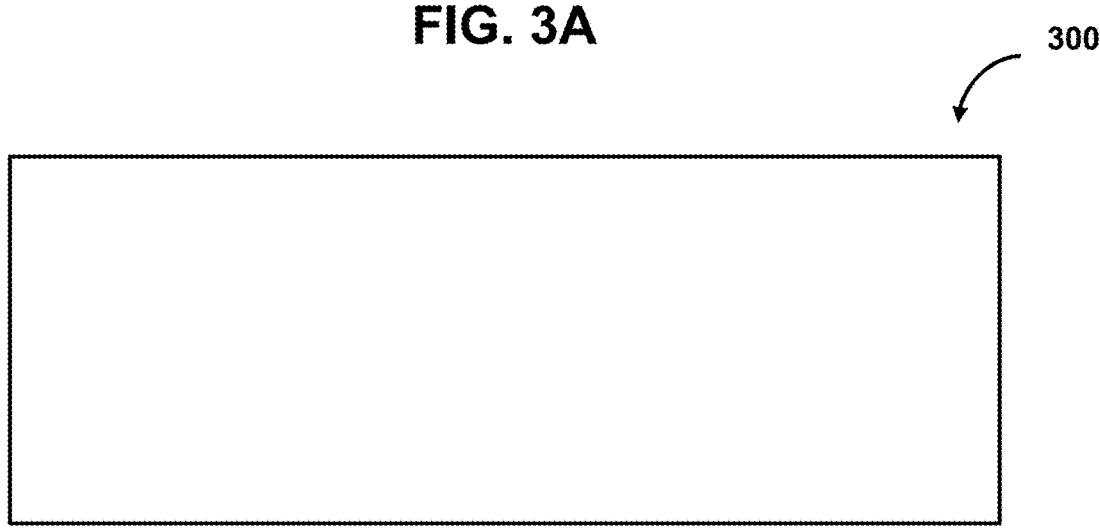

An example of an invisible text editor 300 is illustrated in FIG. 3A. As illustrated, the invisible text editor 300 may capture the characters (for example, characters 302) entered via a keyboard portion 212. Such captured characters may be sent by the client application (which is hosted on the client device 106) to the virtual device 104. In response to receiving one or more characters from the client device 106, the virtual device 104 may store the message (for example, the obtained characters) in a virtual device text editor, update the message based on additional inputs, and send an updated virtual device UI (reflecting the updated message, including a current interaction (cursor) position within the message) to the client device 106 to be displayed via a display of the client device 106. Although the characters 302 illustrated in FIG. 3A are illustrated to correspond to the message 206 in FIG. 2A, it should be understood that the invisible text editor may simply capture each character (or each work) and delete such a character (or word) from the invisible text editor once the character (word) has been sent by the client application to the virtual device 104. In other words, after capturing the character "H" (or word "Hi") the invisible text editor may delete this character once the client application sends this character (or word) to the virtual device 104. Deleting a character (or word) from the invisible text editor as soon as the character (or word) has been sent by the client application to the virtual device 104 would reduce the chances of confidential information being compromised to malicious actors. Alternatively, as illustrated in FIG. 3A, the invisible text editor may capture each character, retain a plurality of characters, and delete these characters in response to an occurrence of an event. Such an event may include closing the client application (or closing a virtual application accessed via the client application), not utilizing the keyboard 212 for a predetermined amount of time, an elapse of a predetermined amount of time, or interaction (for example, a touch event) with the virtual device UI portion 202 (for example, changing the position of the cursor on the virtual device UI portion 202, selecting one or more characters on the virtual device UI portion 202, or selecting another input field (for example, a different input field in an email displayed via the virtual device UI portion 202)) or the client device UI portion 204. FIG. 3B illustrates an invisible text editor 300 that has been deleted subsequent to sending a character (or a word) to the virtual device 104 or in response to an occurrence of an event described above.

In some embodiments, in response to an interaction (for example, a touch event) with the user interface 200, the client device 106 (for example, the position determination subsystem 128) may determine a position of such an interaction within the user interface 200. Details regarding processing of touch events by the client device 106 is described in U.S. Pat. No. 9,619,673, which is incorporated herein by reference. A position of interaction with the user interface may include one or more X and Y coordinates associated with the user interface 200. For example, if the user interaction corresponds to a selection of a cursor position within the virtual device UI portion 202, then the client device 106 may determine a single X and Y coordinate as an user interface interaction position associated with such user interaction. On the other hand, if the user interaction corresponds to a selection a plurality of characters within the virtual device UI portion 202 (for example, selection of the word "are" in FIG. 2C), then the client device 106 may determine a plurality of X and Y coordinates (for example, a start position coordinate and an end position coordinate) as user interface interaction positions associated with such user interaction.

In response to a determination of the user interface interaction position(s) (for example, the X and Y coordinates of the user interface interaction position(s)), the client device 106 may send the user interface interaction position(s) to the virtual device 104. In other words, the virtual device 104 may obtain an user interface interaction position(s) (for example, via the communication subsystem 112) of an interaction with the user interface 200 (for example, interaction with the virtual device UI portion 202). Although the client device 106 determines an user interface interaction position(s), the client device 106 may not know whether the user interface interaction position(s) of the touch event corresponds to a portion of the virtual device UI portion 202 (for example, message 206 or some other portion of the virtual device UI portion 202) or the client device UI 204. The client device 106 may simply detect the user interface interaction position(s) and send the user interface interaction position(s) to the virtual device 104 in order for the virtual device 104 to determine whether the user interface interaction position(s) is within the message 206.

In some embodiments, the user interface interaction position(s) may be detected by the client device 106 and sent to the virtual device 104. Based on the obtained user interface interaction position(s), the virtual device 104 (for example, the position determination subsystem 114) may determine whether the user interface interaction position(s) of the user interaction is within the message 206 based on the obtained user interface interaction position(s). Details regarding processing of touch events by the virtual device 104 is described in U.S. Pat. No. 9,619,673, which is incorporated herein by reference. The virtual device 104 may determine whether a user selected a portion of the message 206 displayed via the virtual device UI portion 202 based on the obtained user interface interaction position(s) and if the virtual device 104 determines that the user selected a portion of the message 206 displayed via the virtual device UI portion 202, the virtual device 104 may determine the exact position of such a selection within the message 206. In other words, the virtual device 104 determines a current interaction position (or current cursor position or message interaction position) within the message 206 based on the obtained user interface interaction position(s). As illustrated in FIG. 2B, in response to the determination of the exact position (for example, the exact cursor position or the exact message interaction position) of the such a selection within the message 206, the virtual device 104 may convey this information (for example, an updated virtual device UI portion 202, including an updated cursor 208) so that the change in the position of the cursor 208 is reflected via the virtual device UI portion 202 in FIG. 2B. FIG. 2B illustrates a change in a cursor position based on a touch event. In another example, as illustrated in FIG. 2C, in response to the determination of the exact positions (for example, the exact cursor positions) of such a selection within the message 206, the virtual device 104 may convey this information (for example, an updated virtual device UI portion 202, including an updated cursor 208) so that the change in the position of the cursor 208 is reflected via the virtual device UI portion 202 in FIG. 2C. FIG. 2C illustrates a change in a cursor position and a selection of characters based on a touch event. The virtual device text editor may be updated with the determined cursor position.

Since the client device 106 may not recognize whether the user interaction is within the message 206 or within another portion of the user interface 200, the user interaction may not be accurately captured and may not be accurately displayed via the virtual device UI portion 202 without the determination of the user interface interaction position(s) by the client device 106 and without the determination of whether the position of the user interaction is within the message by the virtual device 104. For example, without the determination of the user interface interaction position(s) by the client device 106 and without the determination of whether the position of the user interaction is within the message by the virtual device 104, when a user selects a previous portion of the email via a display of the client device 106, the virtual device 104 may not recognize the user's selection position of the previous portion of the email. As such, the virtual device UI portion 202 may incorrectly display a cursor position that is different from a cursor position intended by the user. Accordingly, it is important to convey the user interface interaction position(s) to the virtual device 104 to allow the virtual device 104 to determine the message interaction position (i.e., user interaction position within the message) in order to accurately update the message displayed via the virtual device UI portion 202.

In addition to determining whether the interaction position(s) is within the message 206, the virtual device 104 may also determine whether the interaction position is within any portion of the client device UI portion 204. For example, a keyboard button such as a delete button 214 does not correspond to a typical character input. When the delete button 214 is input via the keyboard portion 212, the client device 106 may detect and send an interaction position corresponding to the delete button 214 to the virtual device 104, and the virtual device 104 may be able to update the message 206 and provide an updated virtual device UI 202 (which reflects the updated message, including an updated cursor position) to be displayed via the user interface 200. In other words, based on the obtained interaction position corresponding to the delete button 214, the virtual device 104 may update the message by deleting a portion of the message and provide the updated message (as an updated virtual device UI 202) to the client device 106. The virtual device text editor may be updated based on such deletion and the current cursor position in the virtual device text editor may be updated based on such deletion. The virtual device 104 is aware of a current message interaction position (or cursor position) either based on the obtained relative cursor position from the client device 106 (for example, relative cursor position obtained from the client device 106 along with the inputs obtained via the keyboard 212) or based on the obtained user interface interaction position(s) (from which the virtual device 104 may determine the current message interaction position).

In some embodiments, the delete button 214 (or any other button such as an hourglass button, send button, next button, arrow button, or enter button that does not correspond to a typical character input) of a keyboard 212 may be represented in other ways. For example, an invisible text editor may capture the selection of the delete button 214 as a sequence of characters (for example, "Id") and the client application may send such sequence of characters to the virtual device 104. The virtual device 104 may recognize the delete function associated with the received sequence of characters, update the message (for example, in the virtual device text editor) by deleting a portion of the message in response to the recognized delete function, update the cursor position in the virtual device text editor based on the deleted portion of the message, and provide an updated virtual device UI 202 (which reflects the updated message, including an updated cursor position) to be displayed via the user interface 200. Similarly, other buttons (for example, an hourglass button, send button, next button, arrow button, or enter button associated with an Android operating system) corresponding to different keyboards may be represented in different ways and these representations may be recognized by the virtual device 104 in order to update the message and provide an updated virtual device UI 202 (which includes the updated message and the updated cursor position) to be displayed via the user interface 200.

In some embodiments, the virtual device 104 may determine a type of keyboard to be displayed via the client device UI portion 204 based on the obtained user interface interaction position(s) from the client device 106. For example, based on the obtained user interaction position, the virtual device 104 may determine that a specific portion of the virtual device UI portion 202 has been selected (for example, a selection of a different input field in an email displayed via the virtual device UI portion 202) and based on such a determination, the virtual device 104 may prepare instructions to send to the client device 106 to instruct the client device 106 to display a specific type of keyboard via the client device UI portion 204. For example, if the client device 106 is operating on an Android operating system, the client device 106 may have a plurality of different types of keyboards (for example, a keyboard associated with numbers including a next button, a keyboard including characters with a done button, a keyboard including characters with a send button). Similarly, client devices 106 operating on other operating systems may have different types of keyboard associated with such operating systems. In response to obtained instructions (indicating a specific type of keyboard to be used) from the virtual device 104, the client device 106 may retrieve the specific type of keyboard (for example, from an internal memory) and display such a keyboard via the client device UI portion 204.

Further, in some embodiments, one or more suggestions may be selected from the suggestion portion 210. For example, in response to a selection of a word from "here," "here's," and "hereby" in FIG. 2A, the client device 106 may send instructions to the virtual device 104 to remove the current word (for example, "here") from the message 206, to replace the current word with the selected word from the suggestion portion 210, and to update the cursor position after the replacement of the current word with the newly selected word. Based on such instructions, the virtual device 104 may update the message and provide the client device with an updated virtual UI portion 202 (which reflects the updated message, including an updated cursor position).

As noted above, the virtual device 104 obtains a message including a plurality of characters from the client device 106. The virtual device 104 may store such a message (including a current cursor position), for example, in virtual text editor (which may be stored in a database 132 (or another database within the computer system 102 or virtual device 104)). In some embodiments, in response to a determination that the touch event corresponds to a touch event within the message 206 (for example, a touch event/user interaction that changes a cursor position within the message 206 or a touch event/user interaction that selects one or more characters within the message 206 via user interface 200 displayed via a display of the client device 106) and a determination of a message interaction position (or cursor position) within the message 206 based on the obtained user interface interaction position(s) of the touch event, the virtual device 104 (for example, the character determination subsystem 116) may extract a first set of characters and a second set of characters from the virtual device text editor (which stores the message) based on the determined message interaction position (or cursor position) within the message.

In some embodiments, if the touch event corresponds to a change in the cursor position (or a selection of a different cursor position) within the message (see FIG. 2B), the virtual device 104 may extract a first set of characters prior to this cursor position within the message and a second set of characters subsequent to this cursor position within the message. As an example, FIG. 2B illustrates a selection of a cursor position different from the cursor position in FIG. 2A. In view of such a touch event/user interaction, the virtual device 104 may extract (or select) a first set of character prior to cursor 208 in FIG. 2B (for example, a first set of characters prior to the space before the word "are") and the virtual device 104 may extract (or select) a second set of characters subsequent to the cursor 208 in FIG. 2B (for example, a second set of characters subsequent to the word "things"). As another example, FIG. 2C illustrates a selection of a plurality of characters, "are", within the message 206. In view of such a touch event/user interaction, the virtual device 104 may extract (or select) a first set of characters prior to a first position of the cursor 208 in FIG. 2C (for example, a first set of characters prior to the letter "a" in the word "are") and the virtual device 104 may extract (or select) a second set of characters subsequent to a second position of the cursor 208 in FIG. 2C (for example, a second set of characters subsequent to the letter "e" in the word "are").

In some embodiments, the extraction (or selection) of the first set of characters and a second set of characters may also be based on one or more predetermined character length parameters. For example, the character length parameters may correspond to a number of characters that are to be extracted from the message for the first set of characters and the second set of characters. The character length parameters may correspond to any length of characters (for example, 4, 8, 16, 32, 64, 100, etc.). The character length parameters for the first set of characters and the second set of characters may be equal or may be different. A number of characters to be included in the first set of characters and the second set of characters may be based on one or more predetermined character length parameters (for example, a first character length parameter associated with a first set of characters and a second character length parameter associated with a second set of characters). However, the virtual device 104 may ensure that the first set of characters and the second set of characters include entire words. For example, even if the first character length parameter is four (4) and if the position of the touch event/user interaction is detected to be after the word "things" (see FIG. 2B), the virtual device 104 may ensure that the word "things" (which includes 6 characters) is included in the first set of characters (as opposed to simply including only four (4) characters, "ings", in the first set of characters).

Figure 3C:
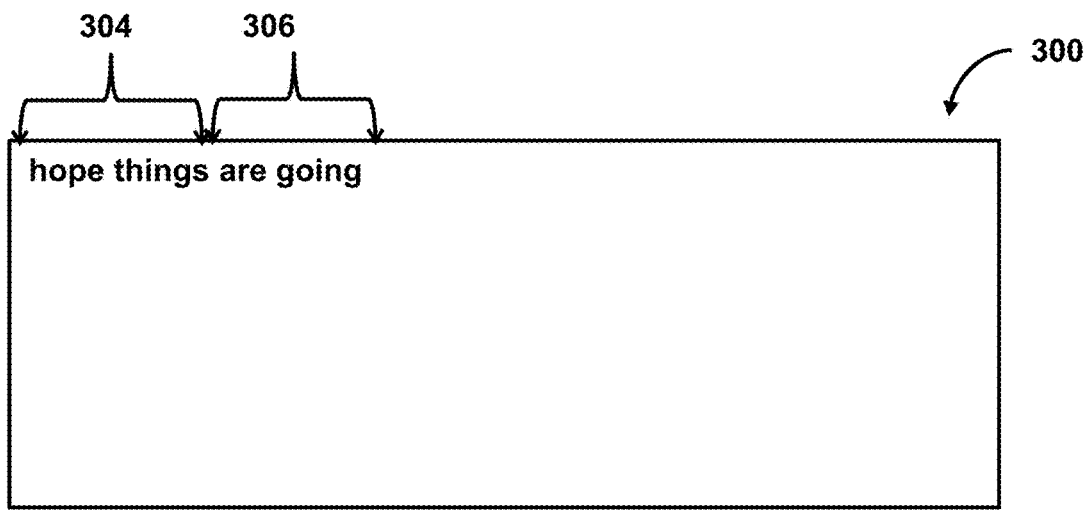

The virtual device 104 (for example, communication subsystem 124) may send the extracted (or selected) first set of characters and the second set of characters to the client device 106, for example, via network 150 such that the extracted (or selected) first set of characters and the second set of characters are sent in response to the user interaction with the user interface 200 (for example, in response to a touch event). As illustrated in FIG. 3C, the invisible text editor (which is associated with the client application hosted on the client device 106) may obtain the first set of characters 304 and the second set of characters 306. The first set of characters 304 (for example, "hope things") and the second set of characters 306 (for example, "are going") correspond to portions of the message, "Hi John, hope things are going well at your end. We are doing well here." Specifically, the first set of characters 304 correspond to a first number of characters from the message that are prior to the determined position of interaction within the message and the second set of characters 306 correspond to a second number of characters from the message that are subsequent to the position of interaction within the message.

In addition to receiving the first set of characters and the second set of characters, the client device 106 may also receive a relative position of the cursor within the first set of characters and the second set of characters. For example, the relative position of the cursor may be a position between the first set of characters and the second set of characters. In one example, if 128 characters (64 characters as the first set of characters and 64 characters as the second set of characters) are sent to the client device 106, the relative cursor position may be after the first 64 characters. In another example, if 64 characters (0 characters as the first set of characters and 64 characters as the second set of characters) are sent to the client device 106, the relative cursor position may be at 0 (i.e., before the first character of the second set of 64 characters). In the example in FIG. 3C, the relative cursor position is after the word "things" (i.e., a position between the first set of characters and the second set of characters). By receiving the relative position of the cursor, the client device 106 is able to generate relevant suggestions for the suggestion portion 210. For example, by knowing that the relative cursor position is next to the word "things," the client device 106 may generate relevant suggestions (for example, "things," "this," and "think" in FIG. 2B) for the suggestion portion 210. Accordingly, knowing the relative cursor position within the first set and second set of characters allows the client device 106 to provide relevant suggestions via the suggestion portion 210 (see FIG. 2B), thereby improving the user experience.

Other characters of the message (other than the first set of characters and the second set of characters) are not sent to the client device 106 in response to the touch event/user interaction associated with the user interface 200. Sending only a first set of characters and a second set of characters (without sending other characters of, for example, a large message) is advantageous because it reduces network latency associated with editing large documents.

As noted above, in addition to receiving the first and second set of characters, the client device 106 also receives an updated virtual UI portion 202 (see FIGS. 2B and 2C), including updated position(s) of the cursor 208 based on the touch event/user interaction. The updated virtual UI portion 202 may include, for example, a new cursor position within the message 206. As illustrated in FIG. 2B, the client device 106 may obtain the updated virtual UI portion 202 from the virtual device 104 and the updated virtual UI portion 202 may be displayed via the user interface 200. As illustrated in FIG. 2B, the cursor 208 may be displayed between the words "things" and "are" in response to the touch event/user interaction associated with user interface 200 (for example, in response to a user selection of a cursor position between the words "things" and "are"). In another example, as illustrated in FIG. 2C, the cursor 208 may be displayed as a selection of a word "are" in response to the touch event/user interaction associated with the user interface 200 (for example, in response to a user selection of a portion of the user interface 200 corresponding to the word "are"). The updated virtual device UI portion 202 may include an image of the virtual device UI associated with the virtual device 104.

Subsequent to obtaining the updated virtual device UI portion 202 (see FIGS. 2B and 2C), subsequent to obtaining the first set of characters and the second set of characters (see FIG. 3C), or subsequent to updating the suggestion portion 210, additional user inputs (for example, another touch event/user interaction associated with the virtual device UI portion 202 or another input of characters (or another selection of any portion of the keyboard 212) via the client device UI portion 204) may be obtained. Details associated with the processing of the additional user inputs, updating the virtual device text editor, updating the user interface 200 (for example, to reflect an updated message (including an updated cursor position) via the virtual device UI portion 202 or to reflect an updated suggestion portion 210), and updating the invisible text editor 300 with additional sets of characters in view of the additional user inputs are described above and therefore, for the sake of brevity, are not repeated.

Example Flowcharts

Figure 4:
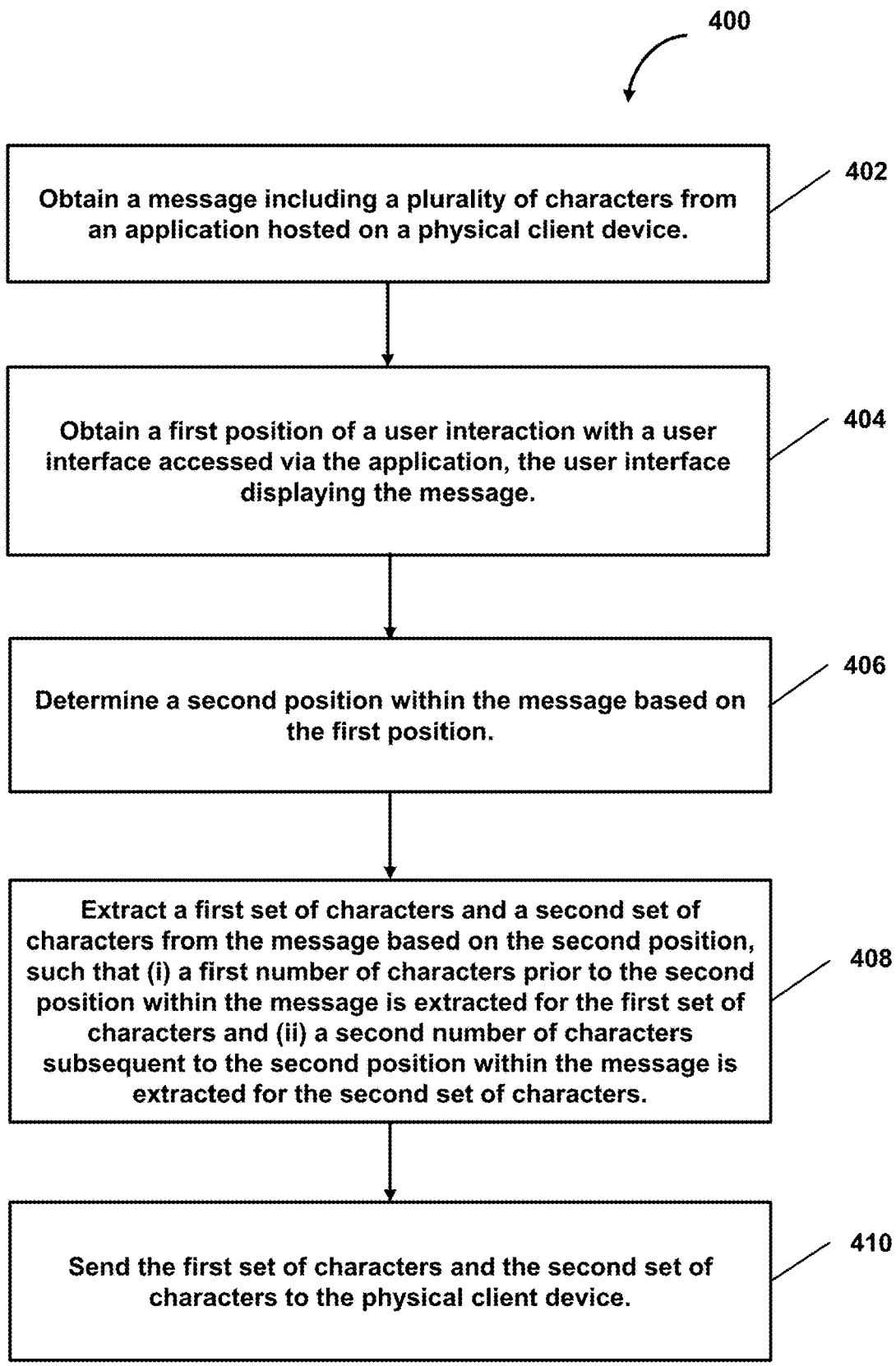
FIG. 4 shows a flowchart of a method for facilitating character editing based on interaction with the user interface of a virtual device accessed via a physical client device, in accordance with one or more embodiments.
Figure 5:
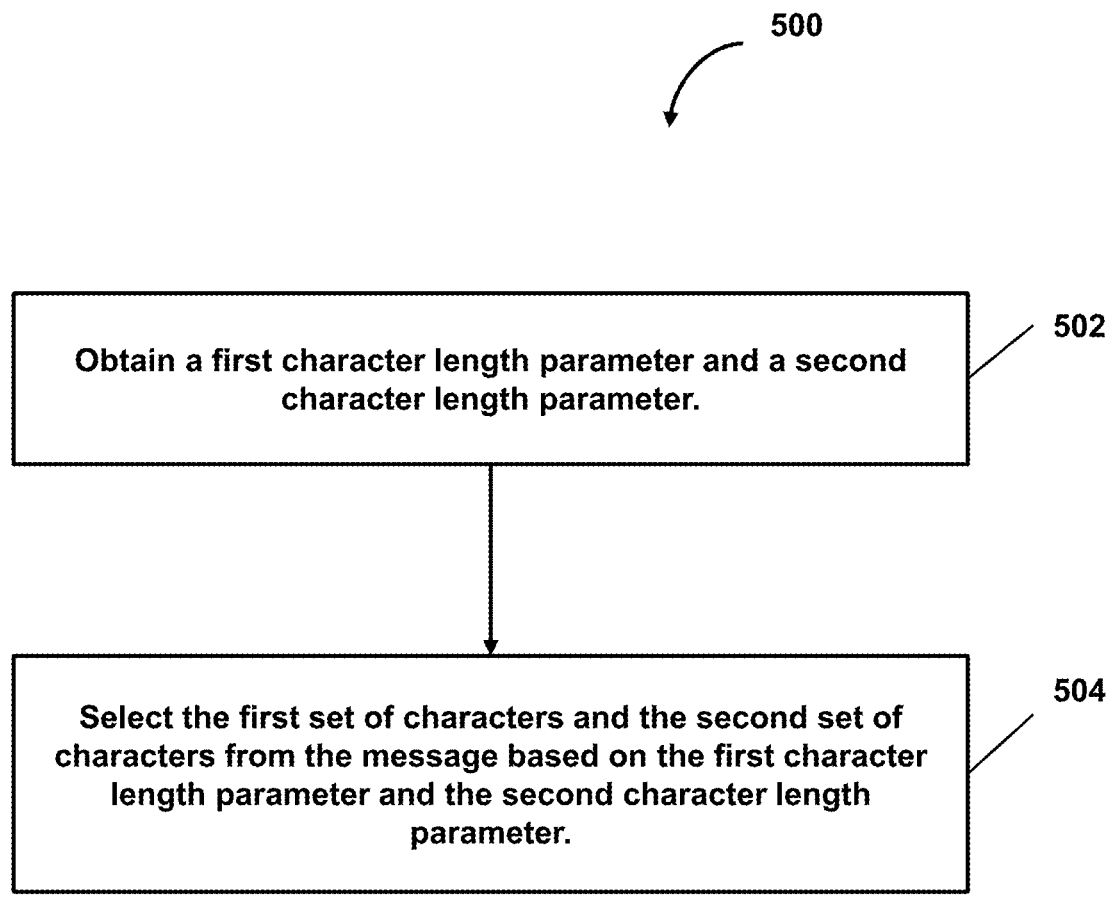
FIG. 5 shows a flowchart of a method for facilitating extraction of a first set of characters and a second set of characters, in accordance with one or more embodiments.
Figure 6:
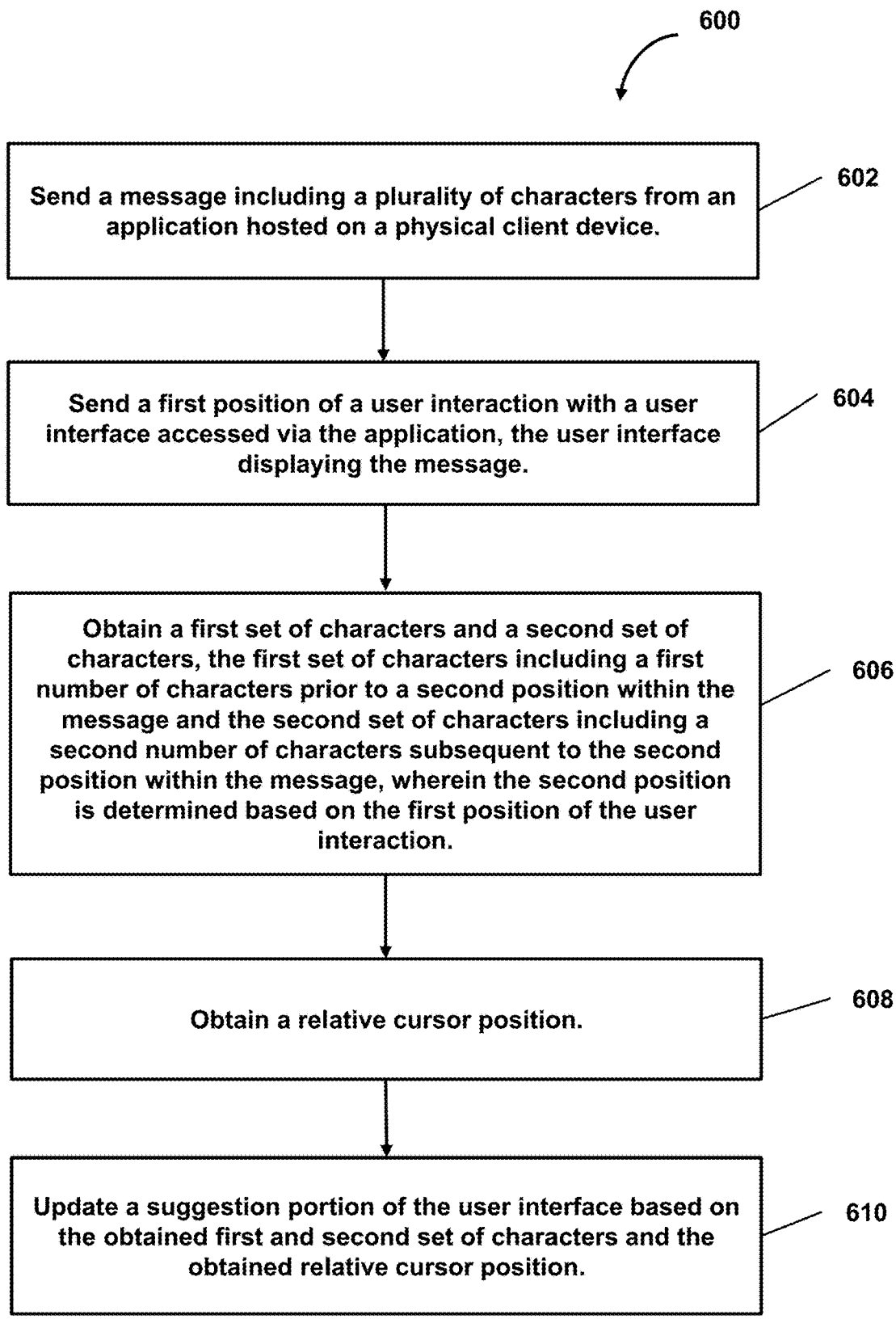
FIG. 6 shows a flowchart of a method for facilitating display of relevant suggestions via a user interface, in accordance with one or more embodiments.

FIGS. 4-6 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 for facilitating character editing based on interaction with the user interface of a virtual device accessed via a physical client device, in accordance with one or more embodiments. In step 402, a virtual device may obtain a message (for example, one or more characters) from an application running on (or hosted by) a physical client device. For example, a keyboard of a physical client device may be utilized to enter a message (including a plurality of characters). The characters input via the keyboard of the physical client device may be captured by an invisible text editor associated with the application running on (or hosted by) the physical client device and such an application may send the captured characters to a virtual device. In step 404, a first position of interaction with a user interface accessed via the application may be obtained. The user interface may correspond to a user interface associated with the virtual device and the user interface may display the message obtained in step 402 via a display of the physical client device. In response to an interaction (for example, a touch event) with the user interface, the client device may determine a first position of such an interaction within the user interface and the virtual device may obtain the first position of such interaction within the user interface. The first position of interaction may include one or more X and Y coordinates associated with the user interface. For example, if the interaction corresponds to a selection of a new cursor position within the message, the first position of interaction may include the new cursor position as X and Y coordinates. As another example, if the interaction corresponds to a selection of one or more characters within the message, the first position of interaction may include a first start position and a first end position (as X and Y coordinates) corresponding to a start position and an end position of the selection of one or more characters within the message.

In step 406, based on the obtained first position of user interaction with a user interface, a second position within the message may be determined. In other words, a virtual device may determine a position of interaction within the message (or a cursor position within the message) based on the position of user interaction with a user interface. In step 408, a first set of characters and a second set of character from the message may be extracted (or selected) based on the determined second position in step 406. The first set of characters and the second set of characters may be extracted (or selected) from the message such that (i) a first number of characters prior to the second position within the message is extracted (or selected) for the first set of characters and (ii) a second number of characters subsequent to the second position within the message is extracted (or selected) for the second set of characters. For example, if a touch event/user interaction corresponds to a change in the cursor position (or a selection of a different cursor position) within the message, the virtual device may extract (or select) a first set of characters prior to this cursor position within the message and a second set of characters subsequent to this cursor position within the message. As another example, if a touch event/user interaction corresponds to a selection of one or more characters within the message, the virtual device 104 may extract (or select) a first set of characters prior to a first position of the cursor and the virtual device may extract (or select) a second set of characters subsequent to a second position of the cursor. In step 410, the first set of characters and the second set of characters may be sent to the physical client device.

FIG. 5 shows a flowchart of a method 500 for facilitating extraction of a first set of characters and a second set of characters, in accordance with one or more embodiments. In step 502, a first character length parameter and a second character length parameter associated with the first set of characters and the second set of character may be obtained. The character length parameters may correspond to a number of characters that are to be extracted from the message for the first set of characters and the second set of characters. The character length parameters may correspond to any length of characters (for example, 4, 8, 16, 32, 64, 100, etc.). The character length parameters for the first set of characters and the second set of characters may be equal or may be different. In step 504, the first set of characters and the second set of characters may be selected based on the first and second character length parameters. In other words, a number of characters to be included in the first set of characters and the second set of characters may be based on the character length parameters (for example, a first character length parameter associated with a first set of characters and a second character length parameter associated with a second set of characters). Also, the virtual device may ensure that the first set of characters and the second set of characters include entire words.

FIG. 6 shows a flowchart of a method 600 for facilitating display of relevant suggestions via a user interface of a physical client device, in accordance with one or more embodiments. In step 602, a message including a plurality of characters may be sent from an application hosted on a physical client device. For example, a keyboard of a physical client device may be utilized to enter a message (including a plurality of characters). The characters input via the keyboard of the physical client device may be captured by an invisible text editor associated with the application running on (or hosted by) the physical client device and such an application may send the captured characters to a virtual device. The user interface (for example, displayed via a display of the physical client device) may also include a suggestion portion and the suggestion portion may provide suggestions based on the position of a cursor. In step 604, a first position of a user interaction with the user interface accessed via the application hosted on the physical client device may be sent to a virtual device. The user interface may correspond to a user interface associated with a virtual device and may display the message sent in step 602 via a display of the physical client device. In response to an interaction (for example, a touch event) with the user interface, the client device may determine a first position of such an interaction within the user interface and send the first position of such interaction to the virtual device. The first position of interaction may include one or more X and Y coordinates associated with the user interface. For example, if the interaction corresponds to a selection of a new cursor position within the message, the first position of interaction may include the new cursor position as X and Y coordinates. As another example, if the interaction corresponds to a selection of one or more characters within the message, the first position of interaction may include a first start position and a first end position (as X and Y coordinates) corresponding to a start position and an end position of the selection of one or more characters within the message.

In step 606, a first set of characters and a second set of characters may be obtained. The first set of characters may include a first number of characters and the second set of characters may include a second number of characters. The virtual device may determine a second position of interaction within the message (for example, a cursor position within the message) based on the first position of user interaction with a user interface. The first number of characters may correspond to characters prior to the determined second position of interaction within the message and the second number of characters may correspond to characters subsequent to the second position of interaction within the message. For example, if a touch event/user interaction corresponds to a change in the cursor position (or a selection of a different cursor position) within the message, a first set of characters may include a first number of characters prior to this cursor position within the message and a second set of characters may include a second number of characters subsequent to this cursor position within the message. As another example, if a touch event/user interaction corresponds to a selection of one or more characters within the message, a first set of characters may include a first number of characters prior to a first position of the cursor and a second set of characters may include a second number of characters subsequent to a second position of the cursor. The invisible text editor associated with the client application may obtain the first set of characters and the second set of characters.

In step 608, in addition to obtaining the first and second set of characters, the physical client device may obtain a relative position of the cursor within the first set of characters and the second set of characters. For example, the relative position of the cursor may be a position between the first set of characters and the second set of characters. In one example, if 128 characters (64 characters as the first set of characters and 64 characters as the second set of characters) are obtained, the relative cursor position may be after the first 64 characters. In another example, if 64 characters (0 characters as the first set of characters and 64 characters as the second set of characters) are obtained by the client device 106, the relative cursor position may be at 0 (i.e., before the first character of the second set of 64 characters). In step 610, the suggestion portion (portion that displays relevant suggestion based on a cursor position) may be updated based on the obtained first set of characters, second set of characters, and the relative position of the cursor within the first and second set of characters.

In some embodiments, the various computers and subsystems illustrated in FIG. 1 may include one or more computing devices that are programmed to perform the functions described herein. The computing devices may include one or more electronic storages (e.g., database(s) 132, or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth®, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118, 122-128, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 and 122-128 described herein is for illustrative purposes, and is not intended to be limiting, as any of subsystems 112-118 and 122-128 may provide more or less functionality than is described. For example, one or more of subsystems 112-118 and 122-128 may be eliminated, and some or all of its functionality may be provided by other ones of subsystems 112-118 and 122-128. As another example, additional subsystems may be programmed to perform some or all of the functionality attributed herein to one of subsystems 112-118 and 122-128.

Although the present disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques will be better understood with reference to the following enumerated embodiments:

1. A method comprising: obtaining a message including a plurality of characters from an application hosted on a physical client device; obtaining a first position of a user interaction with a user interface accessed via the application, the user interface displaying the message; determining a second position within the message based on the first position; and extracting a first set of characters and a second set of characters from the message based on the second position, such that (i) a first number of characters prior to the second position within the message is extracted for the first set of characters and (ii) a second number of characters subsequent to the second position within the message is extracted for the second set of characters;

2. The method according to embodiment 1, further comprising: sending the first set of characters and the second set of characters to the physical client device.

3. The method according to any of embodiments 1-2, wherein the user interface is associated with a virtual device.

4. The method according to any of embodiments 1-3, wherein the sending includes sending the first set of characters and the second set of characters to the physical client device in response to the user interaction without sending other characters of the message to the physical client device.

5. The method according to any of embodiments 1-4, wherein the user interaction corresponds to a selection of a cursor position within the message or a selection of one or more characters within the message.

6. The method according to any of embodiments 1-5, wherein the message is obtained via a keyboard of the physical client device accessed by the application.

7. The method according to any of embodiments 1-6, further comprising: obtaining one or more additional inputs from the physical client device, the one or more additional inputs including an addition of one or more first characters to the message or a deletion of one or more second characters from the message.

8. The method according to any of embodiments 1-7, further comprising: updating the message in response to the obtained one or more additional inputs from the physical client device; and updating the second position within the message in response to the obtained one or more additional inputs.

9 The method according to any of embodiments 1-8, wherein the addition of the one or more first characters to the message includes addition of the one or more first characters to the first and second set of characters, and wherein the deletion of the one or more second characters from the message includes deletion of the one or more second characters from the first and second set of characters or deletion of the one or more second characters other than the first and second set of characters from the message.

10. The method according to any of embodiments 1-9, wherein the determination of the second position within the message includes a determination of a start position and an end position within the message.

11. The method according to any of embodiments 1-10, further comprising: in response to another user interaction with the user interface, obtain an updated first position of the other user interaction; updating the second position within the message based on the updated first position; extracting a third set of characters and a fourth set of characters from the message based on the updated second position, such that (i) a third number of characters prior to the updated second position within the message is extracted for the third set of characters and (ii) a fourth number of characters subsequent to the updated second position within the message is extracted for the fourth set of characters; and sending the third set of characters and the fourth set of characters to the physical client device.

12. The method according to any of embodiments 1-11, wherein extracting the first set of characters and the second set of characters from the message is based on one or more character length parameters such that (i) the first number of characters prior to the second position within the message is extracted for the first set of characters based on a first character length parameter and (ii) the second number of characters subsequent to the second position within the message is extracted for the second set of characters based on a second character length parameter.

13. The method according to any of embodiments 1-12, wherein the first character length parameter is equal to the second character length parameter.

14. A system, comprising: one or more processors; and memory storing instructions that when executed by the processors cause the processors to effectuate operations comprising those of any of embodiments 1-13.

15. A tangible, non-transitory, machine-readable medium storing instructions that when executed by a data processing apparatus cause the data processing apparatus to perform operations comprising those of any of embodiments 1-13.

What is claimed is:

1. A system for improving text editing at a physical smartphone connected to a virtual smartphone via a hidden text interface of the physical smartphone by providing real-time transmission of cursor-position-adjacent characters presented on the virtual smartphone to the hidden text interface of the physical smartphone, the system comprising:
   a virtual device platform including circuitry configured to:
      cause a user interface of the virtual smartphone to be presented on a touchscreen display of the physical smartphone, wherein the user interface of the virtual smartphone enables a user of the physical smartphone to interact with the user interface of the virtual smartphone via the touchscreen display of the physical smartphone;
      display a message and a cursor within the message on the user interface of the virtual smartphone, the message including a plurality of characters inputted via an invisible text editor hosted on the physical smartphone;
      in response to a user touch event at the touchscreen display of the physical smartphone, update a cursor position of the cursor at the virtual smartphone such that the cursor is displayed in a different position within the message; and in connection with the updating of the cursor position of the cursor, provide, to the invisible text editor of the physical smartphone via the Internet, a left set of eight or more characters of the message that are left of the cursor position and a right set of eight or more characters of the message that are right of the cursor position, wherein the left and right sets of eight or more characters are sent via the Internet in response to the user touch event without sending other characters of the message to the physical smartphone.

2. The system of claim 1, wherein the user touch event corresponds to a selection of the cursor position within the message or a selection of one or more characters within the message.

3. The system of claim 1, wherein the updating of the cursor position within the message includes a determination of a start position and an end position within the message.

4. The system of claim 1, wherein the message is obtained via a keyboard of the physical smartphone accessed by the invisible text editor.

5. The system of claim 1, wherein the left set of eight or more characters includes more characters than the right set of eight or more characters.

6. The system of claim 1, wherein the circuitry is further configured to:
obtain one or more additional inputs from the physical smartphone, the one or more additional inputs including an addition of one or more first characters to the message or a deletion of one or more second characters from the message.

7. The system of claim 6, wherein the circuitry is further configured to:
update the message in response to the one or more additional inputs obtained from the physical smartphone; and
update the cursor position within the message in response to the obtained one or more additional inputs.

8. The system of claim 6, wherein the addition of the one or more first characters to the message includes addition of the one or more first characters to the left and right sets of eight or more characters, and wherein the deletion of the one or more second characters from the message includes deletion of the one or more second characters from the left and right sets of eight or more characters or deletion of the one or more second characters other than the left and right sets of characters from the message.

9. The system of claim 1, wherein the circuitry is further configured to:
in response to a second user touch event at the touchscreen display of the physical smartphone, further update the cursor position of the cursor at the virtual smartphone; and
in connection with the further updating of the cursor position of the cursor, provide, to the invisible text editor of the physical smartphone via the Internet, a second left set of characters of the message that are left of the further updated cursor position and a right set of characters of the message that are right of the further updated cursor position, wherein the second left and right sets of characters are sent via the Internet in response to the second user touch event without sending other characters of the message to the physical smartphone.

10. A method comprising:
causing a user interface of a virtual machine to be presented on a touchscreen display of a mobile device, wherein the user interface of the virtual machine enables a user of the mobile device to interact with the user interface of the virtual machine via the touchscreen display of the mobile device;
displaying a message and a cursor within the message on the user interface of the virtual machine, the message including a plurality of characters inputted via a hidden text interface hosted on the mobile device;
in response to a user touch event at the touchscreen display of the mobile device, updating a cursor position of the cursor at the virtual machine such that the cursor is displayed in a different position within the message; and
in connection with the updating of the cursor position of the cursor, providing, to the hidden text interface of the mobile device via the Internet, a left set of characters of the message that are left of the cursor position and a right set of characters of the message that are right of the cursor position, wherein the left and right sets are sent via the Internet in response to the user touch event without sending other characters of the message to the mobile device.

11. The method of claim 10, wherein the user touch event corresponds to a selection of the cursor position within the message or a selection of one or more characters within the message.

12. The method of claim 10, wherein the message is obtained via a keyboard of the mobile device accessed by the hidden text interface.

13. The method of claim 10, further comprising:
obtaining one or more additional inputs from the mobile device, the one or more additional inputs including an addition of one or more first characters to the message or a deletion of one or more second characters from the message.

14. The method of claim 13, further comprising:
updating the message in response to the obtained one or more additional inputs from the mobile device; and
updating the cursor position within the message in response to the obtained one or more additional inputs.

15. The method of claim 13, wherein the addition of the one or more first characters to the message includes addition of the one or more first characters to the left and right sets of characters, and wherein the deletion of the one or more second characters from the message includes deletion of the one or more second characters from the left and right sets of characters or deletion of the one or more second characters other than the left and right sets of characters from the message.

16. The method of claim 10, wherein the updating of the cursor position within the message includes a determination of a start position and an end position within the message.

17. The method of claim 10, further comprising:
in response to a second user touch event at the touchscreen display of the mobile device, further updating the cursor position of the cursor at the virtual machine; and
in connection with the further updating of the cursor position of the cursor, providing, to the hidden text interface of the mobile device via the Internet, a second left set of characters of the message that are left of the further updated cursor position and a second right set of characters of the message that are right of the further updated cursor position, wherein the second left and right sets are sent via the Internet in response to the second user touch event without sending other characters of the message to the mobile device.

18. One or more non-transitory, computer-readable media storing instructions that, when executed by one or more processors, effectuate operations comprising:

causing a user interface of a virtual machine to be presented on a touchscreen display of a mobile device, wherein the user interface of the virtual machine enables a user of the mobile device to interact with the user interface of the virtual machine via the touchscreen display of the mobile device;

displaying a message and a cursor within the message on the user interface of the virtual machine, the message including a plurality of characters inputted via a hidden text interface hosted on the mobile device;

in response to a user touch event at the touchscreen display of the mobile device, update a cursor position of the cursor at the virtual machine such that the cursor is displayed in a different position within the message; and in connection with the updating of the cursor position of the cursor, provide, to the hidden text interface of the mobile device via the Internet, a left set of characters of the message that are left of the cursor position and a right set of characters of the message that are right of the cursor position, wherein the left and right sets of characters are sent via the Internet in response to the user touch event without sending other characters of the message to the mobile device.

19. The media of claim 18, wherein the user touch event corresponds to a selection of the cursor position within the message or a selection of one or more characters within the message.

20. The media of claim 18, the operations further comprising:

in response to a second user touch event at the touchscreen display of the mobile device, further updating the cursor position of the cursor at the virtual machine; and in connection with the further updating of the cursor position of the cursor, providing, to the hidden text interface of the mobile device via the Internet, a second left set of characters of the message that are left of the further updated cursor position and a second right set of characters of the message that are right of the further updated cursor position, wherein the second left and right sets are sent via the Internet in response to the second user touch event without sending other characters of the message to the mobile device.

\* \* \* \* \*